United States Patent [19]

Bumgardner

[11] 4,037,959
[45] July 26, 1977

[54] MEANS FOR REAL-TIME LASER SOURCE CHARACTERIZATION

[75] Inventor: Jon H. Bumgardner, Ridgecrest, Calif.

[73] Assignee: The United States of America as represented by the Secretary of the Navy, Washington, D.C.

[21] Appl. No.: 640,523

[22] Filed: Dec. 15, 1975

[51] Int. Cl.² ............................................. G01J 1/00
[52] U.S. Cl. ................................. 356/73; 250/578; 356/141; 356/147; 356/222; 356/225
[58] Field of Search .................. 356/72, 73, 186, 74, 356/141, 147, 152, 218, 222, 225, 226, 234, 235, 256; 250/200, 206, 215, 216, 226, 578

[56] References Cited

U.S. PATENT DOCUMENTS

| 3,687,558 | 8/1972 | Rex | 356/224 X |
| 3,706,493 | 12/1972 | Redmann | 356/152 X |
| 3,761,184 | 9/1973 | McLaughlin, Jr. | 356/256 X |
| 3,858,201 | 12/1974 | Foster | 356/152 X |
| 3,929,398 | 12/1975 | Bates | 356/186 |
| 3,966,325 | 6/1976 | Mohler | 356/224 X |

FOREIGN PATENT DOCUMENTS

| 2,044,908 | 3/1971 | Germany | 356/218 |

Primary Examiner—F. L. Evans
Attorney, Agent, or Firm—R. S. Sciascia; Roy Miller

[57] ABSTRACT

A system for fully characterizing monochromatic radiation incident on the system. The system computes the azimuth and elevation of the point of origin, optical frequency, pulse width, power level and pulse repetition frequency of the source.

5 Claims, 2 Drawing Figures

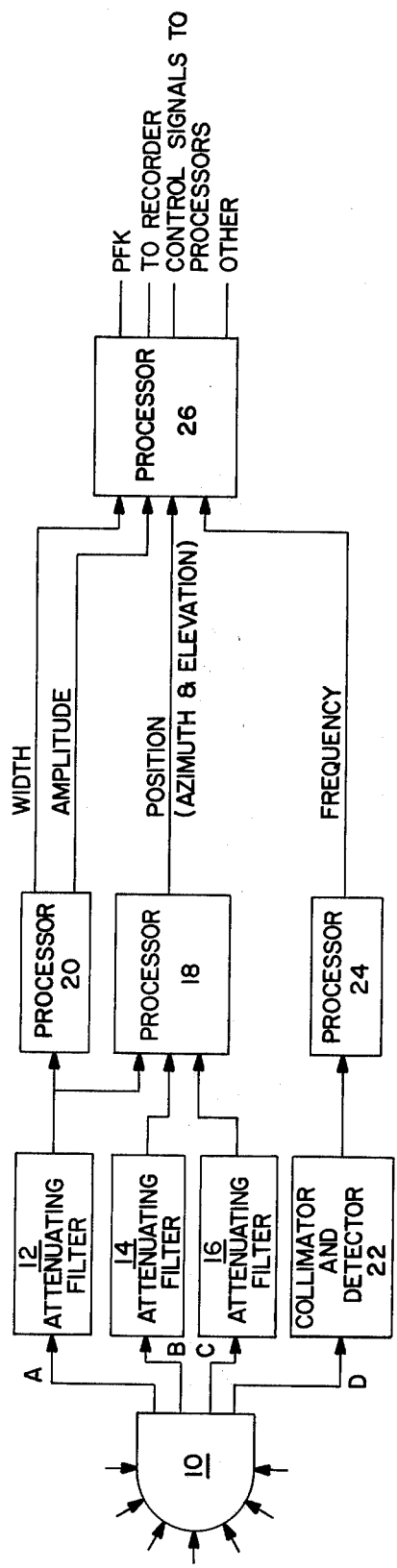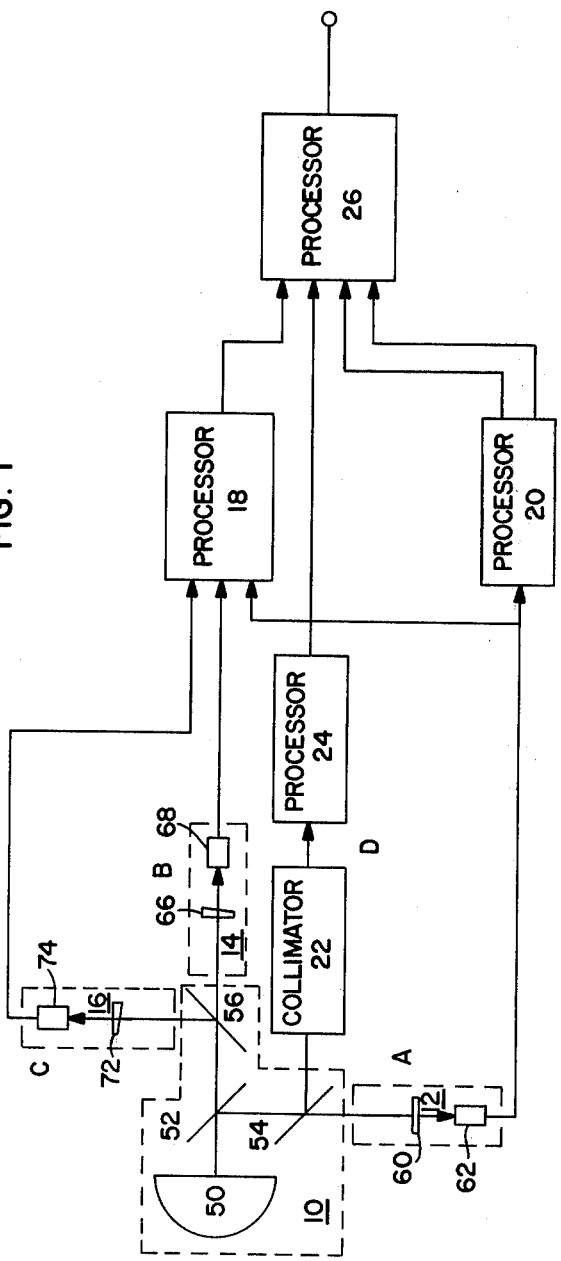

MEANS FOR REAL-TIME LASER SOURCE CHARACTERIZATION

BACKGROUND OF THE INVENTION

In the field of optical source characterization, a source of optical radiation is descriptively defined by a remotely located system that analyses the emitted radiation. Prior systems fail to provide full characterization, or provide full characterization only by employing complex devices and techniques. The present invention provides full and complete characterization of the source with straight forward techniques and known components.

Herein is disclosed a system employing a fish-eye lens for receiving all radiation of interest within a hemispheric area, means for splitting the beam into multiple channels or pathoanalizing the subdivided beam in three of the channels according to position, means for uniquely attenuating the divided beam in each of the three channels so that they can be compared to measure the azimuth and elevation of the source, and the amplitude and pulse width of its beam, and means in another channel for measuring the optical frequency the source is radiating.

BRIEF DESCRIPTION OF THE DRAWING

FIG. 1 is a block diagram of an embodiment of the present invention; and

FIG. 2 is a schematic diagram, partially in block form, of an embodiment of the present invention.

DESCRIPTION OF A PREFERRED EMBODIMENT

FIG. 1 shows a block diagram of an embodiment of the present invention wherein collector 10 is a means for receiving radiation incident thereon and having, such as, a hemispherical field of view, and includes means for dividing a beam of incident radiation into a plurality of channels, such as channels A, B, C, and D. Components that may be employed to carry out the intended function may be a fish-eye lens for receiving the incident radiation, and a plurality of beam splitters for splitting the received beam into a plurality of separate beams, each with it's own path or channel. Each of channels A, B, and C are similar, and differ only in the attenuation they provide.

Each of the three channels has an attenuating filter positioned in the focal plane of its respective path (filters 12, 14 and 16, respectively) which includes a means for spatially modulating the beam according to source position, such as an optical "wedge filter". In one embodiment, the attenuator of channel A has an attenuation factor of 1, or, in other words, is optically clear over the entire spread of the beam, and channels B and C have attenuation factors that vary linearly from 0.5 to 1.0, with the change in channel B being directionally orthogonal to the change in channel C. The spatially separated and attenuated beam in each channel is then optically directed to a detecting means which transforms the optical output of each channel into an electrical output.

As a result, the example embodiment has three channels with the first providing an output that is position independent; the second providing an output that is source position dependent in the North-South direction, for example; and, the third is source position dependent in the East-West direction, for example. The electrical output levels of channels B and C relative to channel A define the point of origin of the source of the incident radiation in the N-S and E-W directions, respectively, Processor 18, which provides the output that identifies the point of origin, may be any of the well known state of the art devices that can perform the function from the above-described outputs.

The output of channel A is also coupled to processor 20 which measures the width and amplitude of the received input. Processor 20 may be any electrical processor that can measure the width and amplitude of an appropriate input electrical pulse, or train of pulses.

An additional channel may be employed to obtain a measurement of the frequency of the radiation incident on receiver 10. An example of such a channel is shown by channel D wherein collimator 22 is employed to collimate the optical component present therein for detection. Processor 24, which processes the radiation collimated by collimator 22 to measure the frequency, may be any frequency or wavelength processors such as the present inventor's co-pending application, entitled "Optical Frequency Processor," filed on Dec. 5, 1975, as Ser. No. 638,137 are hereby incorporated by reference.

The outputs provided by processors 18, 20, and 24 may be coupled to processor 26 for consolidation into outputs that may be coupled to a recorder, or the like. Processor 26 may also provide control signals to the earlier described processors to maintain proper timing and correlation, and it may provide an output indicative of the pulse repitition frequency (PRF), pulse width, pulse amplitude and optical frequency.

The technique employed for an embodiment of the present invention is as follows: If a source of optical energy is present within the field of view, radiation enters receiver 10 and is focused equally onto three attenuating filters in three separate channels. Behind each filter a lens is placed to focus the virtual image onto, such as, a sensitive photo-avalanche diode.

Let us assume that North is at the top of the image, South at the bottom East at the right, and West at the left. After attenuation, the image in the first channel will be clear over the entire image. The image in the second will vary linearly in intensity from East-to-West. And, the image in the third will vary linearly in intensity from North-to-South. In the second and third channels, the varying character of the image is attributable to E-W and N-S attenuation, respectively. For example, the image may be shaded progressively darker from East-to-West in the second, and from North-to-South in the third. Thereby, the outputs of the channels, taken together, can identify the location of the source of radiation within the field on view.

If the fish-eye lens were looking straight up, and the source were directly overhead, i.e., at the center of all the filters, the signal from channel A would be S, for example. It would, in fact, be S for channel A regardless of where the target appeared within the image plane. This results because the attenuation factor in channel A is 1.0 over the entire surface of the image, or field of view. If we consider coordinates (0,0) as being at the center of the images, (0,1) at N, (−1,0) at W, (0,−1) at S, and (1,0) at E, then the attenuation factors of the second and third channels can be written as a function of the coordinates, as follows:

$$\alpha_B = \left(\frac{3+x}{4}\right)$$

$$\alpha_C = \left(\frac{3+y}{4}\right)$$

where: B is the second channel and C is the third channel, and $x$ is measured E-W and $y$ is measured N-S.

When the radiation comes from directly overhead, or at (0,0), for example, $$\alpha_A = 1.0, \quad \alpha_B = \tfrac{3}{4}, \quad \alpha_C = \tfrac{3}{4}.$$

As a result, the output of channel A equals some signal level, and the outputs of channels B and C each equal ¾ that level. The $x$ and $y$ coordinates of the position of the source, may then be calculated from the signal levels and a re-arrangement of the above equations into $$X = \frac{4e_B}{e_A} - 3$$

$$Y = \frac{4e_C}{e_A} - 3$$

where: $e$ is signal level.

If polar coordinates are desired, the following conversions may be made:

$$R_p = \sqrt{\left(\frac{4e_B}{e_A} - 3\right)^2 + \left(\frac{4e_C}{e_A} - 3\right)^2}$$

$$\theta_p = \tan^{-1}\left[\frac{\frac{4e_C}{e_A} - 3}{\frac{4e_B}{e_A} - 3}\right]$$

where: $\theta p$ corresponds to 0° being due East; is $\phi_p$, and equals 90° $(1-P_p)$.

Non-linearity occurring in the fish-eye lens may be compensated for in the filters. The present invention can handle multiple target situations easily since the probability of any two targets emitting coincident pulses is quite small, and each pulse is handled on an individual basis by the present invention. The system can be adapted to full spherical coverage by employing two optical set-ups back-to-back and interfacing the processors.

FIG. 2 shows a schematic diagram of an embodiment of the present invention wherein numerals shown in FIG. 1 are duplicated for like components in FIG. 2. Shown are receiver 10 having fish-eye lens 50 and beam-splitters 52, 54 and 56 for separating the received radiation into channels A, B, C, and D. Channels A, B and C include attenuating spatial filters 12, 14 and 16, respectively, each of which includes an attenuator. Attenuators 66 and 72 which can be any linearly sensitive filters, such as optical wedge filters in channels B and C, respectively, are position sensitive such that they provide outputs that are responsive to the coordinates of the radiation source. Attenuator 60 of channel A is uniform across its face and provides an output that is insensitive to the position of the souce.

Channel A includes uniform attenuator 60, and detector 62. Channel B includes linearly varying attenuator 66, and detector 68. Channel C includes linearly varying attenuator 72, and detector 74. The channels may be identical but for their attenuators. Attenuators 66 (channel B) and 72 (channel C) are oriented orthogonally, per the example. The outputs of channels A, B, and C are coupled to processor 18 for position readout, and channel A is coupled to processor 20 for pulse width and amplitude readout.

Channel D provides a measurement of the frequency radiated by the source by employing a collimator and a system such as the one described by the present inventor in the above-identified U.S. patent application.

The outputs of processors 18, 20, and 24 may be combined to provide a convenient consolidation of outputs, and to provide a measurement of the pulse repetition frequency of the source.

To those skilled in the art it will be obvious upon a study of this disclosure that the present invention permits a variety of modifications in structure and arrangement and hence can be given embodiments other than those particularly illustrated and described herein, without departing from the essential features of the invention and within the scope of the claims annexed thereto.

What is claimed is:

1. A system for analysing beams or rays of monochromatic radiation comprising:
    an image collector for incident radiation anywhere from a large area;
    beam splitters arranged behind the collector to create at least three optical paths for said radiation;
    a plurality of attenuators which are located one in each of the optical paths with one optical path attenuated by a uniform optical filter to provide a reference beam and two other optical paths attenuated by optical filters with linear response which are mounted orthogonally to one another;
    a plurality of electro-optical detectors which are placed so that one is at the end of each optical path to intercept the radiation at that point to produce an electrical analog thereof; and
    a plurality of processing circuits attached to each output of said detectors for converting the electrical outputs therefrom to a value which is a reasonable display of a selected property of said beam, whereby the point of origin of said radiation is determined, the optical frequency is determined, the pulse width is determined, the power level is determined, and the pulse repetition frequency (PRF) is determined.

2. The system for analysing beams or rays of monochromatic radiation as described in claim 1 where the imaging collector is a fish eye lens.

3. The system for analysing beams or rays of monochromatic radiation as described in claim 1 where the plurality of paths total 4.

4. A system for analysing beams or rays of monochromatic radiation as described in claim 2 further comprising:
    means for analysing one of the plurality of optical paths so that the frequency or wavelength of the incident radiation is determined; and
    wherein the remaining path have attenuators that are optical filters; and
    the optical filters are modified to compensate for irregularities in the fish eye lens.

5. A system for analysing beams or rays of monochromatic radiation as described in claim 4 comprising:
    a processor for comparing the attenuation due to each of the orthogonal linear optical filters to the reference path so that the relative location of the point of origin in each of the orthogonal directions is determined; and
    a display for showing the point of origin so determined.

* * * * *